United States Patent
Neubelt

(10) Patent No.: US 7,469,104 B2
(45) Date of Patent: Dec. 23, 2008

(54) COTDR ARRANGEMENT FOR AN UNDERSEA OPTICAL TRANSMISSION SYSTEM COMPRISING MULTIPLE CABLE STATIONS AND MULTIPLE TRANSMISSION SEGMENTS

(75) Inventor: Michael J. Neubelt, Little Silver, NJ (US)

(73) Assignee: Red Sky Subsea, Ltd., Chelmsford (GB)

( * ) Notice: Subject to any disclaimer, the term of this patent is extended or adjusted under 35 U.S.C. 154(b) by 431 days.

(21) Appl. No.: 11/116,134

(22) Filed: Apr. 27, 2005

(65) Prior Publication Data

US 2008/0050120 A1  Feb. 28, 2008

(51) Int. Cl.
*H04B 10/08* (2006.01)
*H04B 13/02* (2006.01)
*H04B 17/00* (2006.01)

(52) U.S. Cl. ............................ 398/104; 398/10; 398/13
(58) Field of Classification Search .................. 398/10, 398/13, 104
See application file for complete search history.

(56) References Cited

U.S. PATENT DOCUMENTS

| | | | | |
|---|---|---|---|---|
| 6,301,036 | B1 * | 10/2001 | Spencer ........................ | 398/31 |
| 6,327,060 | B1 * | 12/2001 | Otani et al. .................... | 398/83 |
| 6,414,405 | B1 * | 7/2002 | Schesser et al. .............. | 307/149 |
| 2004/0146305 | A1 * | 7/2004 | Neubelt et al. .............. | 398/173 |
| 2004/0208503 | A1 * | 10/2004 | Shieh ........................... | 398/13 |
| 2005/0226614 | A1 * | 10/2005 | Ogiwara et al. ............... | 398/37 |

* cited by examiner

*Primary Examiner*—Jason Chan
*Assistant Examiner*—Nathan M Curs
(74) *Attorney, Agent, or Firm*—Choate, Hall & Stewart, LLP

(57) ABSTRACT

A land-based cable station is provided for interfacing with first and second undersea transmission segments of an undersea optical transmission system. At least one first bypass optical transmission path is provided for selectively coupling reflectometry probe signals and backscattered and reflected signals located at a prescribed wavelength from a first interface device to a second interface device. At least one second bypass optical transmission path is provided for selectively coupling reflectometry probe signals and backscattered and reflected signals located at a prescribed wavelength from the second interface device to the first interface.

10 Claims, 2 Drawing Sheets

COTDR ARRANGEMENT FOR AN UNDERSEA OPTICAL TRANSMISSION SYSTEM COMPRISING MULTIPLE CABLE STATIONS AND MULTIPLE TRANSMISSION SEGMENTS

FIELD OF THE INVENTION

The present invention relates generally to optical transmission systems, and more particularly to the use of an arrangement to allow coherent optical time domain reflectometry (COTDR) to be used to detect faults in the optical transmission path of an optical transmission system consisting of multiple spans of fiber and optical amplifiers.

BACKGROUND OF THE INVENTION

A typical long-range optical transmission system includes a pair of unidirectional optical fibers that support optical signals traveling in opposite directions. Since the optical signals are attenuated over long distances, the optical transmission line will typically include repeaters that restore the signal power lost due to fiber attenuation and are spaced along the transmission line at some appropriate distance from one another. The repeaters include optical amplifiers. The repeaters also include an optical isolator that limits the propagation of the optical signal to a single direction.

In long-range optical transmission links it is important to monitor the health of the system. For example, monitoring can detect faults or breaks in the fiber optic cable, localized increases in attenuation due to sharp bends in the cable, or the degradation of an optical component. Amplifier performance must also be monitored. For long haul undersea cables there are two basic approaches to in-service monitoring: monitoring that is performed by the repeaters, with the results being sent to the transmission terminal via a telemetry channel, and shore-based monitoring in which a special signal is sent down the line and is received and analyzed for performance data.

Coherent optical time domain reflectometry (COTDR) is one shore-based technique used to remotely detect faults in optical transmission systems. In COTDR, an optical probe pulse is launched into an optical fiber and backscattered signals returning to the launch end are monitored. In the event that there are discontinuities such as faults or splices in the fiber, the amount of backscattering generally changes and such change is detected in the monitored signals. Backscattering and reflection also occur from discrete elements such as couplers, which create a unique signature. The link's health or performance is determined by comparing the monitored COTDR with a reference record. New peaks and other changes in the monitored signal level being indicative of changes in the fiber path, normally indicating a fault.

One complication that occurs when COTDR is used in a multi-span transmission line in which the individual spans are concatenated by repeaters is that the optical isolators located downstream from each repeater prevent the backscattered signal from being returned along the same fiber on which the optical probe pulse is initially launched. To overcome this problem each repeater includes a bidirectional coupler connecting that repeater to a similar coupler in the opposite-going fiber, thus providing an optical path for the backscattered light so that it can be returned to the COTDR unit in the transmission terminal. In most DWDM links employing such a return path there may also be a filter immediately following the coupler so that only the COTDR signal is coupled onto the return path, thus avoiding interference that would occur if the signals from one fiber were coupled onto the return path fiber. Thus, signals generated by the backscattering and reflection of a COTDR optical probe pulse launched on one fiber are coupled onto the opposite-going fiber to be returned to the COTDR unit for analysis.

One type of highly specialized optical transmission network in which COTDR techniques may be employed is an undersea or submarine optical transmission system in which a cable containing optical fibers is installed on the ocean floor. Repeaters are located along the cable, which contain the optical amplifiers that provide amplification to the optical signals to overcome fiber loss.

The design of the land-based terminals (the "dry-plant") and the undersea cable and repeaters (the "wet plant") are typically customized on a system-by-system basis and employ highly specialized terminals to transmit data over the undersea optical transmission path. For this reason the wet and dry plants are typically provided by a single entity that serves as a systems integrator. As a result all the elements of the undersea system can be highly integrated to function together. For example, all the elements can exchange information and commands in order to monitor service quality, detect faults, and locate faulty equipment. In this way the quality of service from end to end (i.e., from one land-based terminal to another) can be guaranteed. Moreover, since there is a single systems integrator involved, the system operator always knows who to contact in the event of a failure.

Recently, undersea optical transmission systems have been proposed in which the wet plant can be designed independently of the dry plant. Specifically, the wet plant is designed as an independent, stand-alone network element and is transparent to the dry plant. In this way the wet plant can accommodate a wide variety of different land-based terminals. In order to achieve such universal transparency, an optical interface device is provided between the wet plant and the terminals. The dry plant, including the optical interface device, is generally located in a cable station that is situated near the shore.

Some undersea optical transmission systems employing optical interface devices have multiple cable stations to interconnect multiple islands or to circumvent unstable geological or political routes. In these systems a COTDR unit would generally need to be located in each cable station to interrogate the wet plant with which it is associated. Since COTDR units are generally quite expensive, it would be advantageous to reduce the number of units that are required in optical transmission systems having multiple cable stations that include optical interface devices.

SUMMARY OF THE INVENTION

The present invention provides a land-based cable station for interfacing with first and second undersea transmission segments of an undersea optical transmission system. The cable station includes optical transmission terminal equipment for receiving and transmitting optical signals that undergo opto-electric conversion therein. A first interface device is operably coupled to the terminal equipment for bidirectionally communicating optical signals between the terminal equipment and the first undersea transmission segment and for providing signal conditioning to the optical signals received from the terminal equipment so that the optical signals are suitable for transmission through the first undersea transmission segment. A second interface device is operably coupled to the terminal equipment for bidirectionally communicating optical signals between the terminal equipment and the second undersea transmission segment and for providing signal conditioning to the optical signals received from the terminal equipment so that the optical signals are suitable for transmission through the second undersea transmission segment. At least one first bypass optical transmission path is provided for selectively coupling reflectometry probe signals and backscattered and reflected signals located at a prescribed wavelength from the first interface device to the second interface device. At least one second bypass optical transmission path is provided for selectively coupling reflectometry probe signals and backscattered and reflected signals located at a prescribed wavelength from the second interface device to the first interface. The first interface device includes a first loopback path for selectively coupling the backscattered and reflected optical signals from a first optical transmission path located therein that receives the reflectometry probe signals from the second bypass path to a second optical transmission path located therein that couples the reflectometry probe signals to the first bypass path. The second interface device includes a second loopback path for selectively coupling the backscattered and reflected optical signals from a second optical transmission path located therein that receives the reflectometry probe signals from the first bypass path and a first optical transmission path located therein that receives the reflectometry probe signals from the second bypass path.

In accordance with one aspect of the invention, the first bypass optical transmission path comprises a plurality of bypass optical transmission paths for coupling the reflectometry probe signals and the backscattered and reflected signals, respectively.

In accordance with another aspect of the invention, the first and second interface devices each include at least one optical amplifier. The first bypass optical transmission path selectively couples reflectometry probe signals from an output of the optical amplifier located in the first interface device to an output of the optical amplifier located in the second interface device.

In accordance with another aspect of the invention, the first and second interface devices are each configured to perform at least one signal conditioning process selected from the group consisting of gain equalization, bulk dispersion compensation, optical amplification, Raman amplification, dispersion slope compensation, PMD compensation, load balancing, and performance monitoring.

In accordance with another aspect of the invention, the optical transmission terminal equipment is terrestrial optical terminal equipment.

In accordance with another aspect of the invention, the optical transmission terminal equipment is a SONET/SDH terminal.

In accordance with another aspect of the invention, the optical transmission terminal equipment is an ATM terminal.

In accordance with another aspect of the invention, the optical transmission terminal equipment is a Gigabit Ethernet terminal.

In accordance with another aspect of the invention, the reflectometry probe signal is a COTDR signal.

In accordance with another aspect of the invention, at least one of the first and second interface devices includes a performance monitoring unit.

In accordance with another aspect of the invention, a method is provided for obtaining status information concerning first and second undersea segments of an undersea optical transmission system. The first and second undersea segments are in communication with one another over a land-based cable station. The method begins by receiving over a first transmission path of the first undersea segment a reflectometry probe signal. The reflectometry probe signal is communicated from the first transmission path of the first undersea segment to the first transmission path of the second undersea segment while the reflectometry probe signal remains in the optical domain. A backscattered and reflected signal is received over the first transmission path of the second undersea segment. The backscattered and reflected signal is communicated from the first transmission path of the second undersea segment to the second transmission path of the first undersea segment while the backscattered and reflected signal remains in the optical domain.

DETAILED DESCRIPTION

Figure 1:
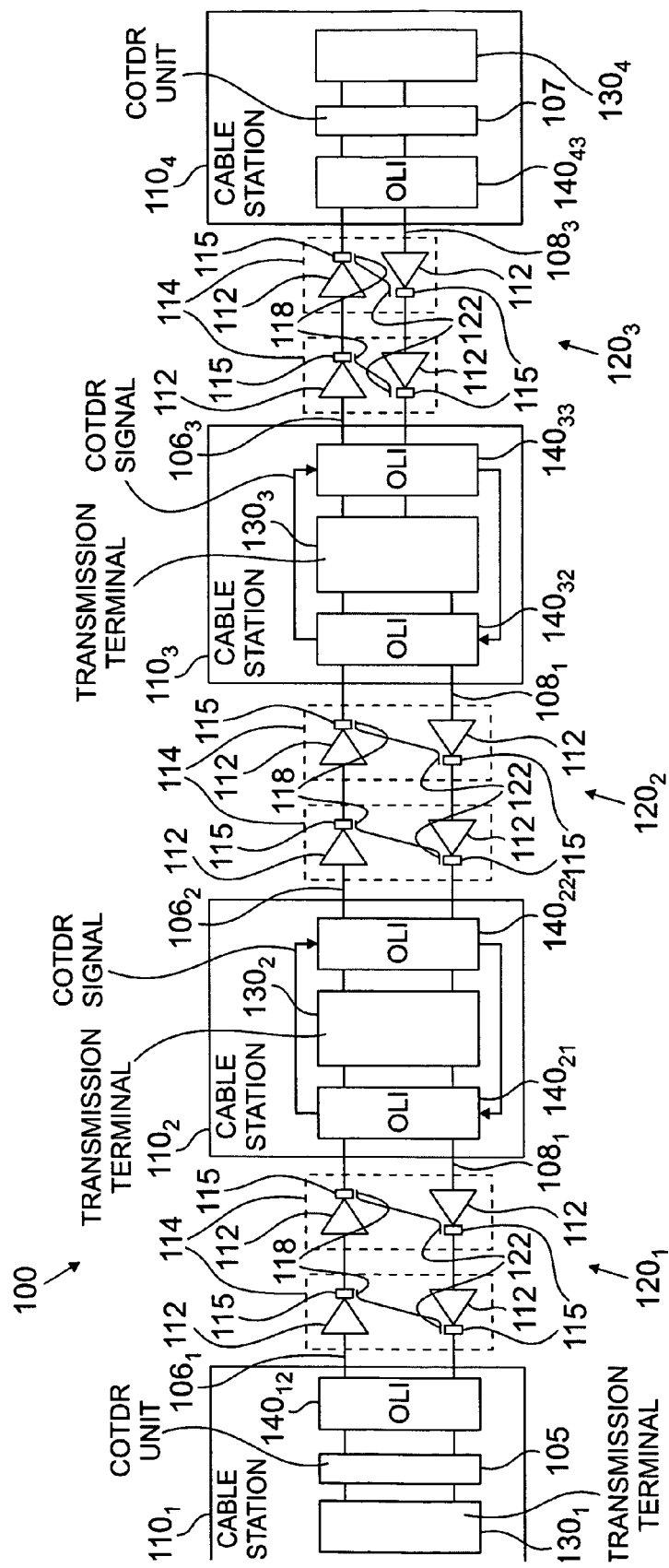
FIG. 1 shows an example of an undersea optical transmission system that comprises two or more undersea segments.

FIG. 1 shows an example of an undersea optical transmission system 100 that comprises two or more undersea segments 120 that may be used to connect islands as well as to circumvent unstable geological or political routes. The networks terminate in land-based cable stations 110 that are located on the islands or the like. Such optical transmission systems are sometimes classified as festoon systems. For purposes of illustration and not as a limitation in the invention, FIG. 1 depicts a transmission system having four cable stations $110_1$-$110_4$ and three undersea segments $120_1$-$120_3$. Of course, the present invention encompasses optical transmission systems with any number of cable stations interconnected by undersea segments. The cable stations each include terminal equipment 130 and at least one optical interface device 140. The number of optical interface devices 140 that is employed in each cable station is determined by the number of undersea segments 120 with which each cable station 110 is to interface. For example, in FIG. 1 cable stations $110_1$ and $110_4$ are terminating cable stations that each interface with only a single undersea segment. Therefore cable stations $110_1$ and $110_4$ each employ only a single optical interface device (optical interface devices $140_{12}$ and $140_{43}$, respectively. On the other hand, cable stations $110_2$ and $110_3$ are depicted as intermediate cable stations that each interface with two undersea segments and therefore they each employ two optical interface devices. Specifically, cable station $110_2$ includes interface device $140_{22}$ for interfacing with undersea segment $120_2$ and interface device $140_{21}$ for interfacing with undersea segment $120_1$. Likewise, cable station $110_3$ includes interface device $140_{33}$ for interfacing with undersea segment $120_3$ and interface device $140_{32}$ for interfacing with undersea segment $120_2$.

The optical interface devices 140 provide transparency between the terminal equipment 130 and the undersea segments 120. That is, each optical interface device provides optical-level connectivity to the terminal equipment 130 and undersea segment 120 with which it is associated. The terminal equipment 130 will typically perform any necessary optical-to-electrical conversion, FEC processing, electrical-to-optical conversion, and optical multiplexing. The terminal equipment 130 may also perform optical amplification, optical monitoring that is designed for the terrestrial optical network, and network protection. For simplicity, the terminal equipment 130 located in the terminating cable stations $110_1$ and $110_4$ and the intermediate cable stations $110_2$ and $110_3$ are depicted by a single functional block. Of course, the terminal equipment 130 employed in the intermediate cable stations will generally be equivalent to two of the terminal equipment units employed in the terminating cable stations, each of the units serving as a transmitter and receiver for one of the two undersea segments interfacing with the intermediate cable station. Examples of terminal equipment that are currently available and which may be used in connection with the present invention include, but are not limited to, the Nortel LH1600 and LH4000, Siemens MTS 2, Cisco 15808 and the Ciena CoreStream long-haul transport products. The terminal equipment 130 may also be a network router in which Internet routing is accomplished as well the requisite optical functionality. Moreover, the terminal equipment 130 that is employed may conform to a variety of different protocol standards, such as SONET/SDH ATM and Gigabit Ethernet, for example.

The optical interface devices 140 provide the signal conditioning and the additional functionality necessary to transmit the traffic over an undersea optical transmission cable. Examples of suitable interface devices are disclosed in U.S. application Ser. Nos. 10/621,028 and 10/621,115, which are hereby incorporated by reference in their entireties. As discussed in the aforementioned reference, the optical interface device disclosed therein receives the optical signals from terminal equipment such as a SONET/SDH transmission terminal either as individual wavelengths on separate fibers or as a WDM signal on a single fiber. The interface device provides the optical layer signal conditioning that is not provided by the SONET/SDH terminals, but which is necessary to transmit the optical signals over the undersea transmission path. The signal conditioning that is provided may include, but is not limited to, gain equalization, bulk dispersion compensation, optical amplification, multiplexing, Raman amplification, dispersion slope compensation, polarization mode dispersion (PMD) compensation, performance monitoring, signal load balancing (e.g., dummy channel insertion), or any combination thereof. Additionally, the optical interface devices 140 may supply pump power to the undersea segments so that Raman amplification can be imparted to the optical signals.

The undersea segments 120 each comprise a pair of unidirectional optical fibers 106 and 108. That is undersea segment $120_1$ comprises unidirectional optical fibers $106_1$ and $108_1$, undersea segment $120_2$ comprises unidirectional optical fibers $106_2$ and $108_2$, and undersea segment $120_3$ comprises unidirectional optical fibers $106_3$ and $108_3$. Optical amplifiers 112 are located along the fibers 106 and 108 to amplify the optical signals as they travel along the undersea segments. The optical amplifiers may be rare-earth doped optical amplifiers such as erbium doped fiber amplifiers that use erbium as the gain medium. As indicated in FIG. 1, a pair of rare-earth doped optical amplifiers supporting opposite-traveling signals is often housed in a single unit known as a repeater 114. Each undersea segment 120 is divided into two or more transmission spans, which are concatenated by the repeaters 114. While only two repeaters 114 per undersea segment 120 are depicted in FIG. 1 for clarity of discussion, it should be understood by those skilled in the art that the present invention finds application in undersea segments of all lengths having many additional (or fewer) sets of such repeaters 114. Optical isolators 115 are located downstream from the optical amplifiers 112 to eliminate backwards propagating light and to eliminate multiple path interference.

The terminating cable station $110_1$ also includes a COTDR unit 105 for determining the status and health of the fiber 106 in the various undersea segments 120 of the transmission system 100. The COTDR unit 105 generates the outgoing optical COTDR probe signal and receives in response the incoming reflected and backscattered COTDR signal for processing. In some embodiments of the invention the COTDR unit 105 may be incorporated directly into the optical interface device $140_{12}$. Likewise, terminating cable station $110_4$ also includes a COTDR unit 107 for determining the status and health of the fiber 108 in the various undersea segments 120 of the transmission system 100.

Each repeater 114 includes a coupler arrangement providing an optical path for use by the COTDR. In particular, signals generated by reflection and scattering of the outgoing COTDR probe signal on fiber 106 between adjacent repeaters enter coupler 118 and are coupled onto the opposite-going fiber 108 via coupler 122. The COTDR signal then travels along with the data on optical fiber 108. COTDR 107 operates in a similar manner to generate COTDR signals that are reflected and scattered on fiber 108 so that they are returned to COTDR unit 107 along optical fiber 106. The signals arriving back at the COTDR units 105 and 107 are then used to provide information about the loss characteristics of each span within each of the undersea segments.

As shown in FIG. 1, in the present invention COTDR units are only located in the terminating cable stations $110_1$ and $110_4$. That is, the COTDR units located in the terminating cable stations $110_1$ and $110_4$ can interrogate each of the outgoing undersea segments $120_1$, $120_2$ and $120_3$ situated along the length of the transmission system 100. In this way intermediate cable stations $110_2$ and $110_3$ avoid the need to incorporate their own dedicated COTDR units, thereby reducing their cost as well as increasing the available space in these cable stations.

Figure 2:
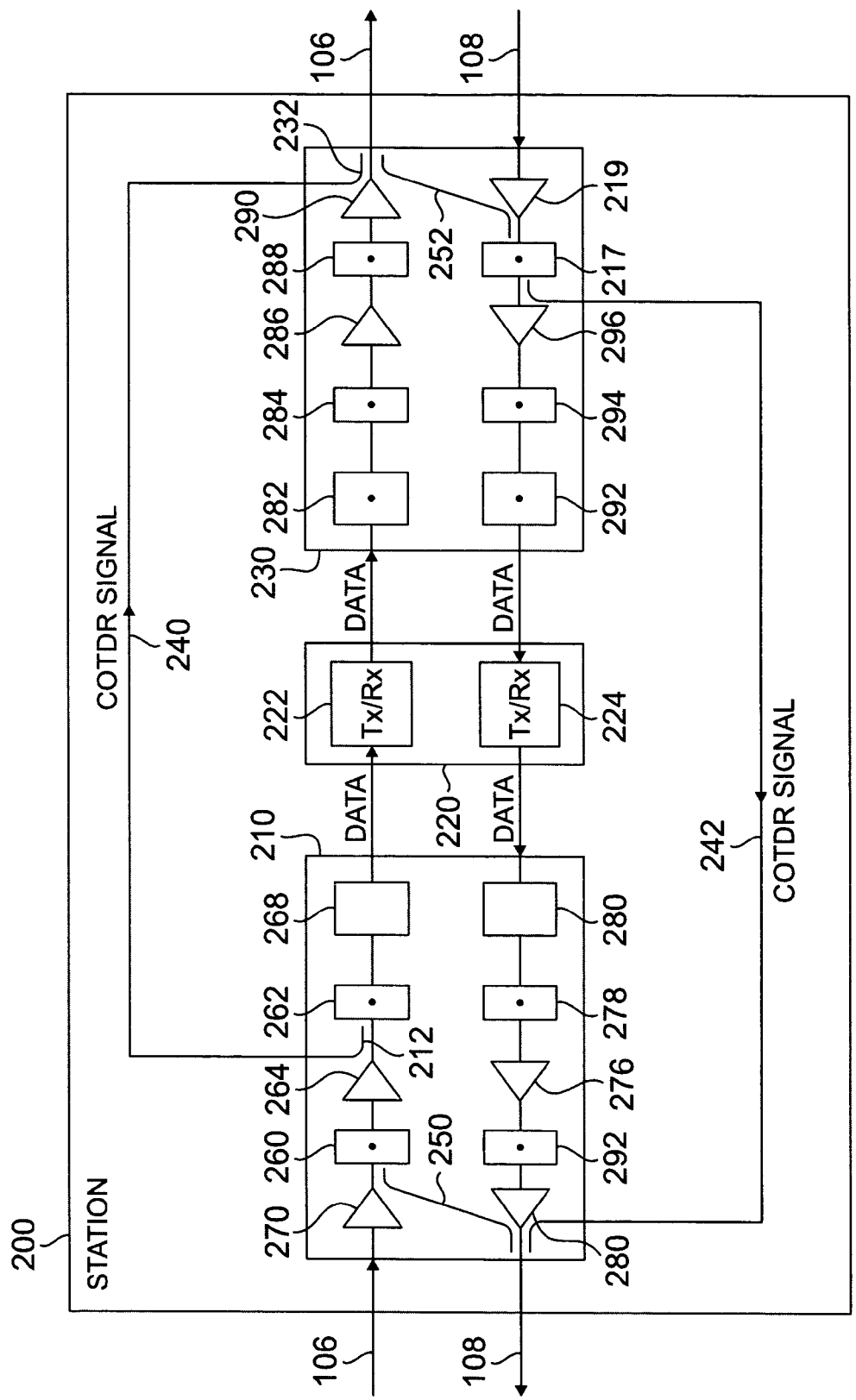
FIG. 2 shows an embodiment of a cable station that may be employed as one of the intermediate cable stations shown in FIG. 1.

FIG. 2 shows an embodiment of a cable station 200 that may be employed as one of the intermediate cable stations $110_2$ and $110_3$ shown in FIG. 1. Intermediate cable station 200 includes westward-facing optical interface device 210, optical terminal equipment 220, and eastward-facing optical interface device 230. Optical terminal equipment 220 includes a transmitter and receiver portion 222 that receives optical signals from westward-facing interface device 210 and communicates optical signals to eastward-facing optical interface device 230. Optical terminal equipment 220 also includes a transmitter and receiver portion 224 that receives optical signals from eastward-facing interface device 230 and communicates optical signals to westward-facing optical interface device 210.

Each of the optical interface devices 210 and 230 include transmission and receiver portions, which in turn each include various optical signal processing units. By way of example, with respect to optical interface device 210, such optical signal processing units may include performance monitor 260, gain equalizer 262, optical amplifiers 264 and 270, and dispersion compensator 268. Some examples of appropriate optical interface devices that may be employed in the present invention are discussed in more detail in the aforementioned co-pending patent applications.

In accordance with the present invention, the COTDR probe signals received by intermediate cable station 200 are demultiplexed by the optical interface device that receives them. The demultiplexed COTDR probe signals are then routed to the other optical interface device, thereby avoiding the transmission terminal 220. For example, in FIG. 2, the COTDR probe signal traveling along the eastbound optical fiber 106 is demultiplexed by westbound-facing optical interface device 210 and routed to eastbound-facing optical interface device 230, where it is re-multiplexed with the data channels. Likewise, the COTDR probe signal traveling along the westbound optical fiber 108 is demultiplexed by eastbound-facing optical interface device 230 and routed to westbound-facing optical interface device 210, where it is re-multiplexed with the data channels. By avoiding the transmission terminal 220 in this manner, the integrity of the COTDR probe signals is maintained since they do not undergo optical to electrical conversion in the terminal equipment 220.

The COTDR probe signal may be demultiplexed by an optical coupler such as a wavelength selective coupler located in each of optical interface devices. For example, in FIG. 2, optical coupler 212 associated with optical interface device 210 selectively removes the COTDR probe signals received along optical fiber 106 and couples them to bypass optical fiber 240. Optical coupler 232 associated with optical interface device 230 couples the COTDR probe signals from the bypass optical fiber 240 back to optical fiber 106. The COTDR probe signals received along westbound optical fiber 108 are routed in a similar manner over bypass optical fiber 242.

In the embodiment of the invention shown in FIG. 2 the optical coupler 212 that removes or demultiplexes the probe signal is located at the output of optical amplifier 264. That is, the optical coupler 212 is situated downstream from select ones of the signal conditioning components such as the performance monitor 260 and the gain equalizer 262. More generally, however, the optical coupler 212 may be located at any point along the optical path through the optical interface device. However, in some embodiments of the invention it may be advantageous to locate the optical coupler 212 downstream from one of the optical amplifiers as is shown in FIG. 2. In this way the optical probe signals are amplified before they are routed to optical interface device 230, thereby overcoming the optical loss they experienced traversing the preceding undersea segment. Likewise, in FIG. 2 the optical coupler 232 that adds or re-multiplexes the probe signal back onto the transmission fiber 106 is shown at the output to optical amplifier 290. More generally, however, the optical coupler 232 may be located at any point along the optical path through the optical interface device. For example, if the optical coupler 212 is located at an input to one of the optical amplifiers in optical interface device 210, it may be desirable to locate the optical coupler 232 downstream from the optical amplifiers in optical interface device 230 so that the gain of the COTDR probe signal is not increased by an unduly large amount. In general, the total gain imparted to the probe signal as it traverses the intermediate cable station 200 should be sufficient to restore it to its initial power level. If, for example, the optical couplers 212 and 232 are located so that the gain imparted to the probe signal is too great, an optical loss element may be provided in bypass optical fiber 240 to reduce the gain as necessary.

Similar to the loopback paths provided in the repeaters, a loopback path is provided in each of the optical interface devices to route the reflected and backscattered COTDR signals to the opposite-going transmission fiber so that it may be returned to the COTDR unit located in the terminating cable station. In particular, optical interface device 210 includes loopback path 250 and optical interface device 230 includes loopback path 252. As shown in the particular embodiment of the invention in FIG. 2, the loopback path 250 is positioned at the output of amplifier 280 so that the reflected and backscattered COTDR signal on optical fiber 108 avoids the isolator associated with optical amplifier 280. Likewise, the loopback path 252 is positioned at the output of amplifier 290 so that the reflected and backscattered COTDR signal on optical fiber 106 avoids the isolator associated with optical amplifier 290. After the reflected and backscattered COTDR signals are routed to the opposite-going transmission fiber they are coupled to the other of the optical interface devices by pass optical fibers 240 or 242 in order to avoid terminal equipment 220. Since the COTDR probe signal and the reflected and backscattered signals are located at substantially the same wavelengths, the optical couplers (e.g., couplers 212 and 232) used to demultiplex and re-multiplex the COTDR probe signal can also be used to demultiplex and re-multiplex the reflected and backscattered COTDR signal. Of course, in some embodiments of the invention separate couplers and bypass fibers may be provided for the COTDR probe signals and the reflected and backscattered COTDR signals.

Although various embodiments are specifically illustrated and described herein, it will be appreciated that modifications and variations of the present invention are covered by the above teachings and are within the purview of the appended claims without departing from the spirit and intended scope of the invention. For example, while the present invention has been discussed in terms of coherent optical time domain reflectometry, the invention is more generally applicable to any optical time domain reflectometry technique.

The invention claimed is:

1. A land-based cable station for interfacing with first and second undersea transmission segments of an undersea optical transmission system, the first and second undersea transmission segments each including two fibers, said cable station comprising:

optical transmission terminal equipment for receiving and transmitting optical signals that undergo opto-electric conversion therein;

a first interface device operably coupled to the terminal equipment for bidirectionally communicating optical signals between the terminal equipment and the first undersea transmission segment and for providing signal conditioning to the optical signals received from the terminal equipment so that the optical signals are suitable for transmission through the first undersea transmission segment;

a second interface device operably coupled to the terminal equipment for bidirectionally communicating optical signals between the terminal equipment and the second undersea transmission segment and for providing signal conditioning to the optical signals received from the terminal equipment so that the optical signals are suitable for transmission through the second undersea transmission segment;

at least one first bypass optical transmission path for selectively coupling reflectometry probe signals and backscattered and reflected signals located at a prescribed wavelength from the first interface device to the second interface device;

at least one second bypass optical transmission path for selectively coupling reflectometry probe signals and backscattered and reflected signals located at a prescribed wavelength from the second interface device to the first interface;

wherein said first interface device includes a first loopback path for selectively coupling the backscattered and reflected optical signals from a first optical transmission path located therein that receives the reflectometry probe signals from the second bypass path to a second optical transmission path located therein that couples the reflectometry probe signals to the first bypass path; and wherein said second interface device includes a second loopback path for selectively coupling the backscattered and reflected optical signals from a second optical transmission path located therein that receives the reflectometry probe signals from the first bypass path to a first optical transmission path located therein that couples the reflectometry probe signals to the second bypass path.

2. The land-based cable station of claim 1 wherein said at least one first bypass optical transmission path comprises a plurality of bypass optical transmission paths for coupling the reflectometry probe signals and the backscattered and reflected signals, respectively 3. The land-based cable station of claim 1 wherein said first and second interface devices each include at least one optical amplifier, said first bypass optical transmission path selectively coupling reflectometry probe signals from an output of the optical amplifier located in the first interface device to an output of the optical amplifier located in the second interface device.

4. The land-based cable station of claim 1 wherein the first and second interface devices are each configured to perform at least one signal conditioning process selected from the group consisting of gain equalization, bulk dispersion compensation, optical amplification, Raman amplification, dispersion slope compensation, PMD compensation, load balancing, and performance monitoring.

5. The land-based cable station of claim 1 wherein said optical transmission terminal equipment is terrestrial optical terminal equipment.

6. The land-based cable station of claim 1 wherein said optical transmission terminal equipment is a SONET/SDH terminal.

7. The land-based cable station of claim 1 wherein said optical transmission terminal equipment is an ATM terminal.

8. The land-based cable station of claim 1 wherein said optical transmission terminal equipment is a Gigabit Ethernet terminal.

9. The land-based cable station of claim 1 wherein the reflectometry probe signal is a COTDR signal.

10. The land-based cable station of claim 1 wherein at least one of said first and second interface devices includes a performance monitoring unit.

* * * * *